July 16, 1946.  S. W. SEELEY  2,403,958
WAVE PRODUCING AND WAVE FREQUENCY MEASURING DEVICE
Filed Nov. 13, 1942
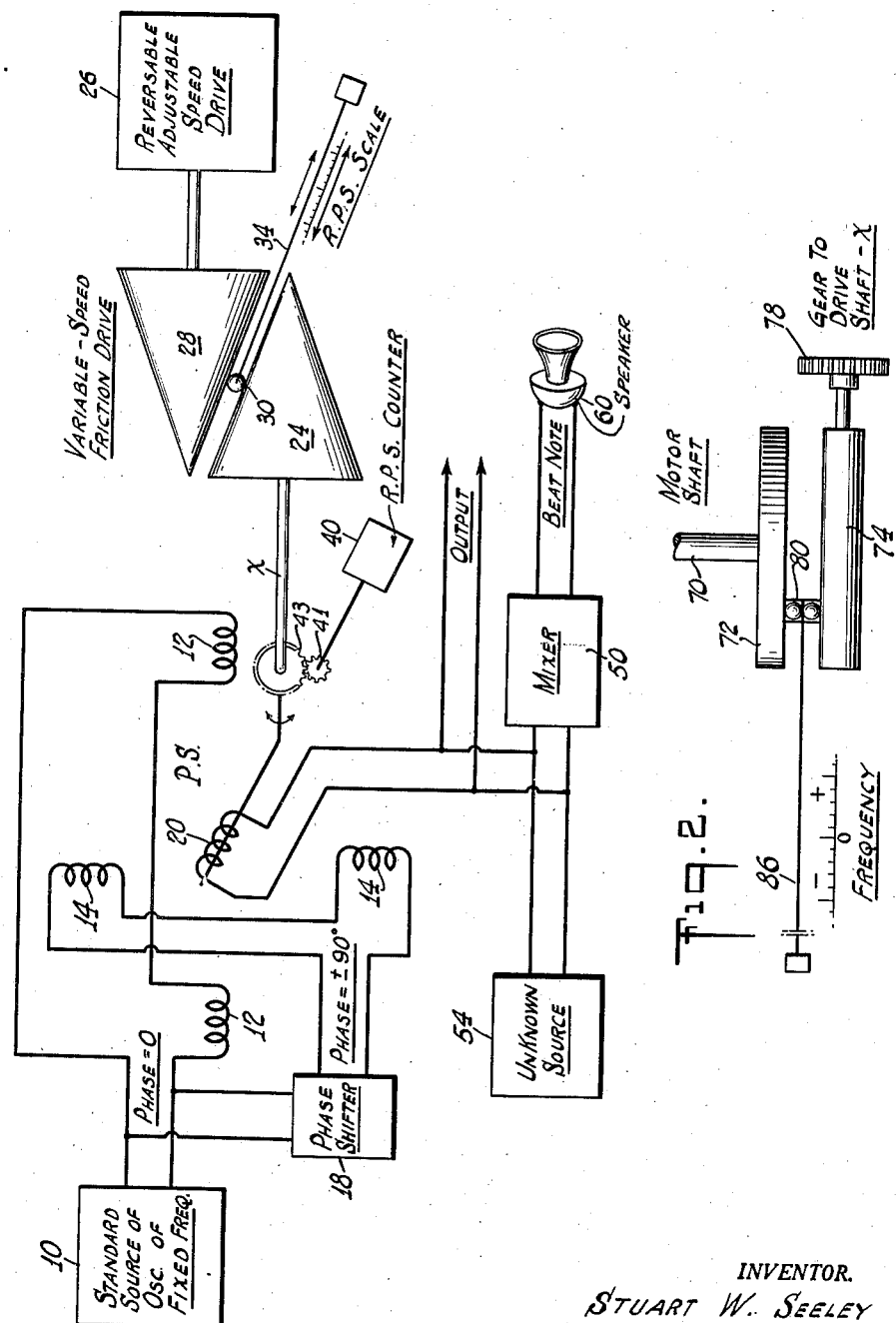
INVENTOR.
STUART W. SEELEY
BY H. S. Grover
ATTORNEY

Patented July 16, 1946

2,403,958

UNITED STATES PATENT OFFICE 2,403,958

WAVE PRODUCING AND WAVE FREQUENCY MEASURING DEVICE

Stuart W. Seeley, Roslyn, N. Y., assignor to Radio Corporation of America, a corporation of Delaware Application November 13, 1942, Serial No. 465,428

9 Claims. (Cl. 250—39)

Sometimes it is essential to produce an accurately known frequency which is not an exact multiple of one of the more easily produced and maintained standard frequencies, but is perhaps so close to one of said multiples or other easily produced standard frequencies that selectivity after a heterodyning process is insufficient to readily separate out the desired frequency from other undesired frequencies which are produced by the heterodyning process.

As a simple example, suppose it were necessary to produce 1,000,003.5 cycles per second. This might be necessary at a so-called frequency monitoring station which was called upon to check the frequency of a nominal 1,000,000 cycle carrier. If the carrier to be checked gave a 3½ cycle beat with a locally produced 1,000,000 cycle standard frequency, it is difficult to tell whether the broadcast carrier is 1,000,003.5 cycles or 999,996.5 cycles unless the so-called standard frequency is altered slightly and the direction (±) of the change to produce zero beat is noted. Operators of standard frequency equipment are loathe to alter the true frequency of their primary standards even momentarily and by incremental amounts for several reasons. Synchronous clocks run from sub-multiples of such standards and used as "cycle integrators" are adversely affected, etc.

An object of my invention is to provide an improved method and means for producing waves of a substantially exact known frequency, which frequency may be increased or decreased by known increments variable through a substantially unlimited range of frequencies starting at one or more cycles.

A further object of my invention is to provide a new and improved method of, and means for, measuring substantially exactly the frequency of wave energy of unknown frequency.

In describing my invention, reference will be made to the attached drawing wherein:

Figure 1 illustrates a system for producing wave energy of exact known and adjustable frequency and for measuring the frequency of the produced wave energy. The system also provides means for measuring the frequency of wave energy of unknown frequency.

Figure 2 illustrates details of a modified form of the driving mechanism of Figure 1.

In my system, the defects in systems known in the prior art are overcome by the arrangement illustrated in Figure 1. In Figure 1 10 is the standard source of oscillations of fixed frequency and, for purposes of example, assume this standard source has a frequency of 1,000,000 cycles per second. The wave energy from this source is fed at zero phase to the windings 12 of a phase shifter PS and the wave energy of standard frequency is also fed advanced or retarded in phase by 90° to the windings 14 of the phase shifter PS. The windings 12 and 14 are shown as split windings, but in practice may each comprise a single winding. The windings are mounted at right angles to each other to provide a rotating field wherein a rotor winding 20 is maintained. The phase displacement may be obtained by means of a phase shifter 18 of any approved type, such as an electronic phase splitter, there being many phase shifters known in the art which may be used here.

The rotor 20 is connected by a shaft X to a conical friction driven member 24. A reversible and adjustable speed drive mechanism in 26 drives another conical friction driving gear 28. A friction driving means, such as for example, a ball bearing 30 mounted in a race on a member 34 is interposed between the cones 24 and 28 so that rotation of 28 drives 24. The rate of rotation is adjusted by movement of the friction driving means 30 along the parallel faces of the cones 24 and 28. A scale adjacent the member 34 may be calibrated in revolutions per second to thereby indicate the number of rotations of shaft X and rotor 20 per second. A revolution per second counter 40 may be connected to the shaft X by a gear train shown schematically at 41 and 43 so that here again the revolutions per second imparted to the shaft X may be counted.

The rotor winding 20 is connected with an output from which the current in 20 may be supplied to any utilization circuit. The output of 20 is also supplied to a mixer 50, also supplied with current from any source of current represented at 54 which may be of unknown frequency, the frequency of which is to be measured. The output of the mixer 50 is connected to an indicating device, such as, for example, a speaker 60.

Utilizing, merely for purposes of example, the frequencies mentioned hereinbefore in setting forth the need of my invention, suppose the standard source of oscillations of fixed frequency supplies wave energy of a million cycles per second and this wave energy is supplied to the windings 12 and 14 in phase quadrature as illustrated. As long as the rotor winding 20 is standing still, the output frequency of winding 20 is exactly the same as the input frequency, that is, 1,000,000 cycles per second. If the rotor 20 is revolved at say 3½ cycles (revolutions) per second in one direction, the only output frequency appearing in the output terminals is the standard frequency plus 3½ cycles per second. That is, for rotation in this selected one direction the standard frequency is increased by a frequency equal to the revolutions per second of 20. If the rotor 20 is rotated in the opposite direction at the same rate, the output of 20 is the standard frequency minus 3½ cycles per second, thus being below the input frequency.

The rate at which 20 is revolved is observed on the scale adjacent 34 or on the revolution per second counter 40.

Now assume that at 54 a source of wave energy the exact frequency of which is to be determined is present and is impressed on the mixer 50. A beat note will be observed or heard at the indicator 60 and by rotating the rotor 20 at the proper rate and in the proper direction, this beat note will be brought to zero. The indicator at 60 is preferably an oscilloscope so that beat notes which are of low frequency are readily observable. When the beat note is brought to zero, we know that the frequency of the station represented by 54 is equal to the frequency of the standard frequency source in 10 plus or minus a frequency increment equal to the revolutions per second of the rotor winding 20 and since this rate of rotation is indicated at 40 and adjacent 34, the exact frequency of the source in 54 is known.

By usage, we also know that when winding 20 is rotated in one direction, the frequency out of winding 20 is increased (i. e. an increment frequency added to the standard frequency) and that when 20 is rotated in the opposite direction, the frequency out of 20 is decreased. Moreover, by noting whether the beat note in 60 increases or decreases when 20 is rotated in one direction, we can at once determine whether the wave energy out of 54 is above or below the standard frequency at 10 and, as a consequence, quickly bring the beat note to zero by rotating the winding 20 in the proper direction.

The friction gearing mechanism at 24, 28 and 30 may be replaced by the preferred embodiment shown in Figure 2. In Figure 2 the shaft 70 is driven by a constant speed driving means including a motor and this shaft 70 drives a disk 72. A cylindrical driven member 74 drives a gear 78 which may drive shaft X directly or by way of a train of gears. An arrangement of roller bearings 80 are mounted in a race and positioned between the disk 72 and the roller-like driven member 74 so that rotation of disk drives roller 74 due to the friction between 72 and 80 and 80 and 74. The roller bearing arrangement 80 is mounted for radial movement across the face of the disk 72 to thereby vary the speed at which the driven member 74 rotates. When the mechanism 80 is at the axis of the shaft 70, the rate of rotation of 74 is zero and the direction of rotation of 74 reverses as 80 passes from one side of the axis of 70 and 72 to the other side.

A scale marked in frequency may be mounted adjacent the mounting and controlling member 86 to thereby read directly the number of cycles per second at which 20 is rotating and also to indicate directly whether these cycles are to be added to the standard frequency or subtracted therefrom to denote the frequency out of winding 20.

What is claimed is:

1. In an arrangement of the nature described, a source of wave energy the frequency of which is unknown, a source of oscillations of fixed known frequency, connections to said source of oscillations for producing a field having components at right angles to each other, a winding in said field, driving mechanism for rotating said winding in either direction to thereby set up in said winding current of the frequency of said source plus or minus the rate of rotation of said winding, a stage for beating said wave energy against said current and means for adjusting the rate of rotation of said winding.

2. In apparatus for determining the frequency of oscillations of unknown frequency, a source of oscillations of known frequency, a pair of stator windings maintained at right angles with respect to each other, couplings between said source and said windings for feeding thereto oscillation displaced in phase by 90°, a rotor winding in the field of said stator windings, driving mechanism for rotating said rotor winding at a known speed, connections for deriving current from said rotor winding and a mixer stage excited by said first oscillations and said current.

3. In an arrangement of the class described, a source of wave energy the frequency of which is unknown and is to be determined, a source of oscillations of a fixed and known frequency, circuit connections to said source of oscillations for setting up an electrical field having electrical components at right angles to each other to produce a rotating field, a winding in said field, a motor for rotating said winding, a revolution counter for counting the revolutions of said winding, connections for beating current derived from said winding with wave energy of said unknown frequency, and apparatus for adjusting the speed of rotation of said winding until the beat note resulting from said beating action reaches zero.

4. The method of determining the frequency difference between a high frequency voltage of fixed frequency and a second high frequency voltage which includes these steps, deriving from said high frequency voltage of fixed frequency a new voltage the frequency of which differs from the frequency of the voltage from which it is derived an adjustable and known amount, comparing the frequency of said derived voltage with the frequency of the other of said two first mentioned voltages, and adjusting the frequency of said derived voltage to cause said comparison to indicate synchronism between the compared voltages, so that the difference between the frequency of the derived voltage and the frequency of the voltage from which it is derived is also equal to the difference in frequency between said two first mentioned voltages.

5. The method of ascertaining the frequency difference between a first high frequency voltage and a second high frequency voltage which includes these steps, deriving from said first high frequency voltage, without changing its frequency, a new voltage the frequency of which differs from the frequency of the voltage from which it is derived an adjustable and known number of cycles, comparing the frequency of said derived voltage with the frequency of the second of said two first mentioned voltages, and adjusting the frequency of said derived voltage to cause said comparison to indicate synchronism between the compared voltages, so that the difference between the frequency of the derived voltage and the frequency of the voltage from which it is derived is also equal to the difference in frequency between said first and second voltages.

6. The method of determining the frequency difference between two high frequency currents which includes these steps, deriving from one of said currents phase displaced components, combining said phase displaced components to derive a new current of a frequency equal to the frequency of said one current, comparing the frequency of said derived new current with the frequency of the other of said two first mentioned currents, and rotating the phases of said phase displaced components at a known rate and in a direction such as to cause said comparison between said new current and the other of said first mentioned currents to indicate synchronism, the said last known rate being also equal to the difference in frequency between said two first mentioned currents.

7. In an arrangement of the nature described, a source of wave energy the frequency of which is unknown, a source of oscillations of fixed known frequency, connections to said source of oscillations for producing a rotating field, a winding in said field, driving mechanism for rotating said winding in either direction to thereby set up in said winding current of the frequency of said source plus or minus the rate of rotation of said winding, a stage for beating said wave energy against said current and means for adjusting the rate of rotation of said winding.

8. In apparatus for determining the frequency of oscillations of unknown frequency, a source of oscillations of known frequency, stator windings maintained at equal angles with respect to each other, couplings between said source and said windings for feeding thereto oscillation displaced in phase by angles equal to the angles between said windings, a rotor winding in the field of said stator windings, driving mechanism for rotating said rotor at a known speed, connections for deriving current from said rotor winding and a mixer stage excited by said first oscillations and said current.

9. In an arrangement of the class described, a source of wave energy the frequency of which is unknown and is to be determined, a source of oscillations of a fixed and known frequency, circuit connections to said source of oscillations for setting up a rotating electrical field, a winding in said field, a motor for rotating said winding, a revolution counter for counting the revolutions of said winding, connections for beating current derived from said winding with wave energy of said unknown frequency, and apparatus for adjusting the speed of rotation of said winding until the beat note resulting from said beating action reaches zero.

STUART W. SEELEY.